May 22, 1962 A. SILVER 3,035,408
WASTE GATE CONTROL FOR SUPERCHARGER TURBINES
Filed Jan. 4, 1960

INVENTOR:
ALEXANDER SILVER,
BY *Myron J. Seibold*
Attorney.

United States Patent Office 3,035,408
Patented May 22, 1962

3,035,408
WASTE GATE CONTROL FOR SUPERCHARGER TURBINES
Alexander Silver, East Woodland Hills, Calif., assignor to The Garrett Corporation, Los Angeles, Calif., a corporation of California
Filed Jan. 4, 1960, Ser. No. 179
22 Claims. (Cl. 60—13)

This invention relates to the supercharging of the intake of an internal combustion engine by a supercharger having a driving turbine fed from the exhaust gases of the engine and has for its object the provision of an improved waste gate control for by-passing a portion of the exhaust gases around the turbine to control its speed.

Another object of the invention is a waste gate control for internal combustion engine exhaust gases feeding the turbine of a turbosupercharger for the engine intake which is normally biased to closed position and which operates from the turbosupercharger output without a separate pressure force.

Another object of the invention is a waste gate control in accordance with the preceding object which shall fail safe under all conditions of pressure line and diaphragm failure.

Another object of the invention is a waste gate control in accordance with the preceding objects which, upon failure of operating pressure, will function as a blow-off relief valve at an engine exhaust or turbine inlet pressure determined by the value of the closure bias.

A further object of the invention is a waste gate control in accordance with the preceding objects employing a poppet valve having a closing force comprised of a spring bias and a force generated by the turbosupercharger outlet pressure and an opening force which is the sum of forces generated by the turbosupercharger outlet pressure and the turbine inlet pressure and in which the valve is normally opened by the venting of that portion of the turbosupercharger outlet pressure which generates the closing force.

A still further object of the invention is a waste gate control in accordance with the immediately preceding object in which the venting is controlled in accordance with the value of the ratio between the outlet and inlet pressures of the turbosupercharger compressor.

Other objects and features of the invention will be readily apparent to those skilled in the art from the following specification and appended drawings in which.

Figure 1:
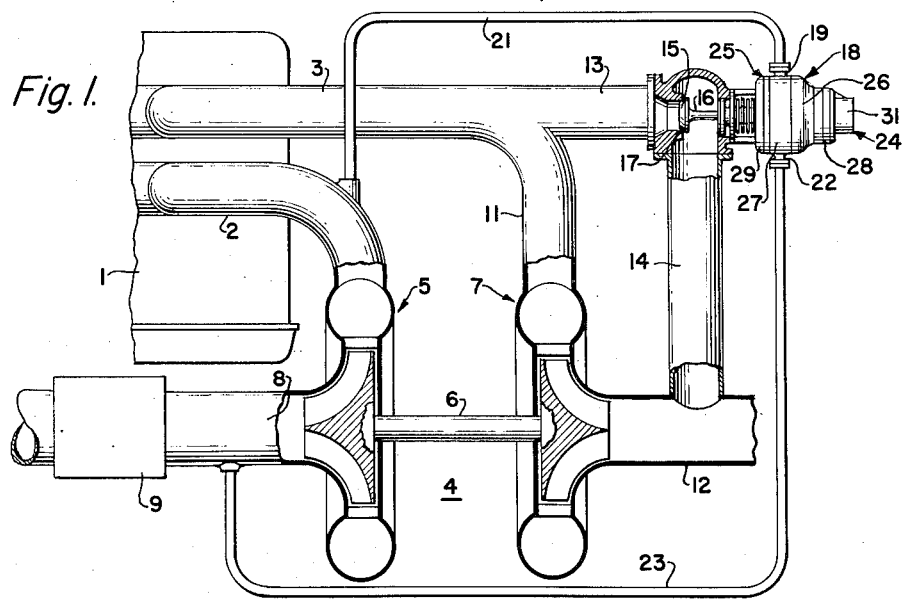
FIG. 1 is a schematic representation of a supercharging system for an internal combustion engine employing a waste gate control according to the present invention.

In the system of FIG. 1 there is shown an internal combustion engine 1, which may be of the diesel type, having an intake conduit 2 and an exhaust gas conduit 3. A turbosupercharger is indicated generally at 4 and comprises a compressor 5 driven through a shaft 6 by a turbine 7. The inlet of the compressor 5 is connected to a conduit 8 leading to the atmosphere through a filter 9. The outlet of compressor 5 is connected to the engine intake conduit 2. The inlet of the turbine 7 is connected through a conduit 11 to the engine exhaust gas conduit 3 and the outlet of the turbine is connected to an exhaust conduit 12. A by-pass around the turbine 7 is provided by conduits 13 and 14, the passage through which is controlled by a by-pass valve including a poppet 15 mounted at the end of a stem 16 and engaging a valve seat 17 to close the by-pass passage around the turbine. The poppet 15 is operated by a controller designated generally at 18 and having an inlet 19 connected by turbine 21 to the outlet pressure from compressor 5. A controller outlet 22 is connected by tubing 23 to the compressor inlet pressure at a point downstream of the filter 9.

Figure 2:
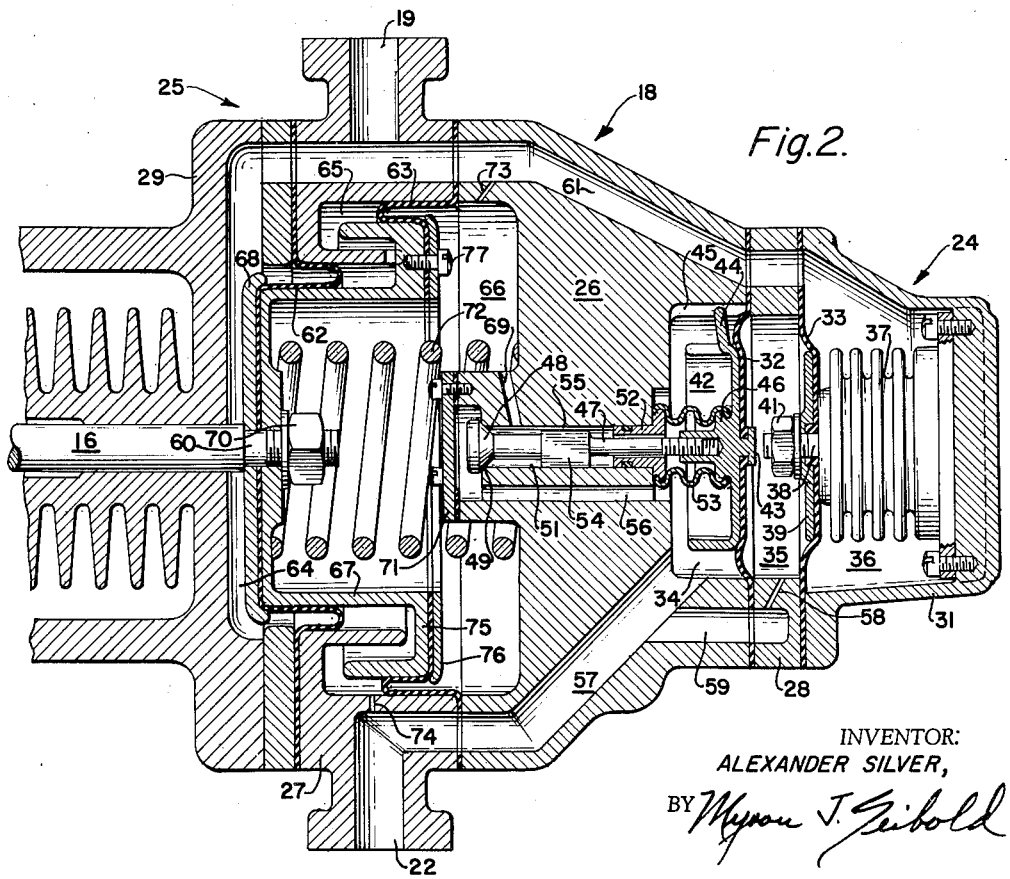
FIG. 2 is a sectional view through the combination control and exhaust by-pass valves performing the waste gate control according to the invention.

The controller 18 is shown in enlarged section in FIG. 2 and comprises a pressure ratio responsive portion 24 controlling the operation of exhaust by-pass poppet valve portion 25. The body of the controller 18 is made up of a plurality of sections, a main body portion 26, a pair of diaphragm spacing portions 27 and 28 at opposite sides of the main body portion, and end caps 29 and 31. Between the opposite sides of the spacing portion 28 and the body portion 26 and end cap 31 are mounted flexible diaphragms 32 and 33, respectively, defining, with the controller sections, the chambers 34, 35 and 36.

Within the chamber 36 and rigidly mounted on the interior face of the end cap 31 is an evacuated bellows 37. The free end of bellows 37 is connected to the diaphragm 33 by a stud 38 passing through the diaphragm 33 and a rigid plate 39 which clamps the diaphragm 33 against the end of the bellows 37 through the nut 41. The diaphragm 32 is connected to a cup-shaped member 42 by engagement with a button 43 which passes through the diaphragm 32 into a position to be engaged by the end of the stud 38. The member 42 is guided for rectilinear movement without rotation by a finger 44 disposed within a slot 45 in the main body portion 26.

The interior surface of the cup-shaped member 42 is provided with a boss 46 into which is threaded the stem 47 of a control poppet valve 48 seating at 49 to seal a passage 51 in the body portion 26. In the right-hand end of the passage 51 is disposed a sealing member 52, sealed to the passage surface but providing a clearance about the stem 47. Sealably connected to the member 52 and to the boss 46 is a corrugated resilient bellows member 53 normally biasing the poppet valve 48 into its closed position. The stem 47 is provided with an enlarged guide portion 54 which has clearances at 55 providing passage for fluid to the interior of the bellows element 53, thus equalizing the fluid forces exerted on the poppet 48.

The outlet of the poppet 48 connects through passage 56 with the chamber 34 which is in turn connected to the low pressure outlet 22 through a passage 52. A restricted passage 58 intercommunicates the chamber 35 with a passage 59 leading to the passage 57. The chamber 36 is connected to the high pressure inlet 19 through the passage 61.

Between the opposite sides of the spacing portion 27 and the end cap 29 and body portion 26 are disposed diaphragms 62 and 63, respectively, dividing the space defined by these sections into three chambers, 64, 65 and 66. The chamber 66 includes the interior of a cup-shaped member 67 having its exterior bottom surface clamped against the diaphragm 62 by a rigid plate 68 through a stud 60 on the end of the valve stem 16 and a nut 70 threaded on the stud. The chamber 66 is communicated with the passage 51 in the control valve via the passage 69 and the outlet of the control valve is sealed from the chamber 66 by a plate 71. A spring 72 reacts against the bottom surface of the cup-shaped member 67 and the main body portion 26 to bias the stem 16 and poppet 15 into closed position. The chamber 64 is directly fed from the controller inlet 19. The chamber 66 is fed from the high pressure passage 61 through a restricted orifice 73. The chamber 65 is connected to the low pressure outlet 22 through a restricted vent 74.

Cup-shaped member 67 is provided with an outer peripheral flange 75 against which the diaphragm 63 is clamped by a plate 76 thorugh a plurality of circumferentially spaced studs 77.

When the engine 1 is at rest, both poppets 15 and 48 are seated in closed position against valve seats 17 and 49, respectively, the poppet 15 being biased into this closed position by the spring 72 and the poppet 48 being biased to closed position by the spring bellows 53. After the engine 1 is started, the turbine 7 rotates to effect a pressure boost from the compressor inlet to the compressor outlet at engine intake conduit 2. The pressure at the compressor outlet is fed through pipe 21 to the inlet opening 19 of the controller 18 to establish the compressor outlet pressure in the passage 61. This pressure passes directly into the chamber 64 to the left of the diaphragm 62 and through the restricted orifice 73 into the chamber 66. Since the passage 69 is closed by the poppet 48 the full compressor outlet pressure will build up within the chamber 66 as well as in chamber 64. Since, however, the effective area of the diaphragm 63 is greater than the effective area of the diaphragm 62 the net result of the compressor outlet pressure within chambers 64 and 66 is to increase the force tending to close the poppet 15. The engine exhaust gas pressure in conduits 3 and 13 will create a force tending to open the poppet 15, this force being generated by the pressure exerted by the exhaust gases on the area of the face of the poppet.

The exhaust by-pass poppet valve thus has four forces exerted thereon, two closing forces represented by the bias of the spring 72 and the force exerted by the compressor outlet pressure on the diaphragm 63 and two opening forces constituted by the force exerted by the compressor outlet pressure on the diaphragm 62 and the force exerted by the engine exhaust gas pressure on the face of the poppet 15.

The pressure ratio portion 24 controls the position of the poppet 48 in the following manner: the diaphragm 33 is biased toward the right, as viewed in FIG. 2, by the pressure differential on the evacuated bellows 37. The chamber 36 is connected to the outlet pressure of the compressor 5 and the chambers 34 and 35 are connected to the inlet pressure of the compressor. The pressure within the chamber 36 creates two forces, one on the bellows tending to move the diaphragm 33 to the right and the other on the greater area of the diaphragm tending to move it to the left, both as viewed in FIG. 2. When the net fluid force on the diaphragm 33 becomes greater than the combined forces of the inherent resilience of the bellows 37 and the force exerted on the evacuated bellows by the pressure within chamber 36, the diaphragm 33 and the parts clamped thereto will move toward the left to engage the end of the stud 38 with the button 43 to effect movement of the diaphragm 32 toward the left against the bias of the bellows element 53. This moves the poppet 48 to its open position and communicates the chamber 66 with the inlet side of the compressor through passages 69, 51, 56, chamber 34 and passage 57. Since the chamber 66 is fed through the restricted orifice 73, the opening of poppet 48 will greatly lower the pressure within this chamber and less the force exerted on the diaphragm 63.

The poppet 15 then moves to open the exhaust by-pass valve under the combined forces exerted on the face of the poppet 15 by the engine exhaust gases and on the diaphragm 62 by the outlet pressure of the compressor of the turbosupercharger, this movement being effected against the bias of the spring 72 and the residual force of the diaphragm 63.

The bypassing of the exhaust gases around the turbine 7 results in a reduction in the speed of rotation of the turbine 7 and hence a reduction in the ratio of the outlet and inlet pressures of the compressor 5. When this ratio reaches a pre-determined low value the diaphragm 33 moves toward the right to permit the poppet 48 to move to closed position under the bias of the bellows element 53. With the poppet 48 closed, pressure again builds up in chamber 66 with the diaphragm 63, cup-shaped member 67 and stem 16 all moving toward the left to move the poppet 15 toward or into its seated position. This modulating action of the poppet 15 continues during engine operation to maintain the ratio of the inlet and outlet pressures of the turbosupercharger compressor at the predetermined desired setting determined by the relative effective areas of the diaphragm 33 and the bellows 37 and the inherent resilient bias of the bellows 37 upon the diaphragm 33.

Since the controller portion 24 is responsive to the ratio between the outlet and inlet pressures of the turbosupercharger compressor, it will automatically compensate for changes in altitude since the chamber 35, being connected to the compressor inlet pressure, will always respond to changes in the operational altitude of the engine. The compressor inlet pressure will approximate the ambient altitude pressure less losses in the compressor conduit and through the filter 9. The pressure ratio portion 24 is thus responsive to the boost pressure through the compressor 5 regardless of the ambient atmospheric pressure at which it is operated.

The exhaust by-pass poppet valve 15 of this invention, although normally biased closed and further held closed by a net force generated by the compressor outlet pressure, will nevertheless fail safe under all modes of element failure, examples of which are as follows: upon loss of compressor outlet pressure the only force exerted on the poppet 15 in the closing direction is the bias of spring 72 and the poppet will blow open as a relief valve when the force exerted by the exhaust gas or turbine inlet pressure on the face of the poppet exceeds the spring bias. If diaphragm 62 is broken the compressor outlet pressure will be fed into chamber 65 within which the pressure will increase due to the restricted vent 74 and this pressure increase will be exerted on the large area of the diaphragm 63 in a valve opening direction. Should diaphragm 63 fail, the pressure within chamber 66 approaches the compressor inlet pressure by feeding through chamber 65 and vent 74, it being remembered that compressor outlet pressure is fed to the chamber 66 through the restricted orifice 73. A failure of the diaphragm 33 will increase the pressure within chamber 35 because of restricted orifice 58 to effect opening of the poppet 48 by the force exerted directly on the diaphragm 32. Failure of the diaphragm 32 will have no effect since ordinarily the chambers 34 and 35 are at the same low pressure through pressure equalizing orifice 58.

While the outlet of control valve 48 and the vent 74 are shown as feeding into the inlet side of the compressor, these could as well be vented to atmosphere except for the possibility of entrance of foreign matter.

The following are examples of relative values for elements of the exhaust by-pass valve in a system designed to limit the ratio of the compressor outlet and inlet pressures to a value of 2.18:

Spring 72 load—
    Poppet 15 closed _____lbs__ 20
    Poppet 15 open _____lbs__ 40
Diaphragm areas—
    Diaphragm 62 _____sq. in__ 3
    Diaphragm 63 _____sq. in__ 8.9
Valve—
    Area poppet 15 _____sq. in__ 2.1

The operating pressures for the above exhaust by-pass valve are as follows:

| | Compressor Inlet Pressure | Compressor Outlet Pressure | Pressure Turbine Inlet | Pressure Chamber 66 | |
|---|---|---|---|---|---|
| | | | | Poppet 15 Cracked | Poppet 15 Wide Open |
| Sea Level | 14.7 | 32 | 29.0 | 21.8 | 19.5 |
| 10,000 Ft. | 10.4 | 22.0 | 19.0 | 15.2 | 13.0 |

It is thus seen that the waste gate control of this invention is normally spring biased to closed position so that as the engine 1 is started all of the exhaust gases will pass through conduits 3 and 11 to the turbine 7 to quickly bring it up to speed. Further the operation of the by-pass poppet valve is independent of sources of pressure other than the compressor outlet pressure and further that the by-pass valve is fail safe for all modes of failure of valve elements. The integration of the control and by-pass valves further results in a simplification of plumbing and lessens the possibility of leakage. With the face area of the by-pass poppet exposed to turbine inlet pressure (engine exhaust pressure), the waste gate control will, in the event of element failure, blow off like a spring-loaded relief valve at turbine inlet pressures which are within safe limits.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, and a pair of forces operating to urge said valve means in a direction to open said bypass passage, one of said forces being generated by a surface on said valve means exposed to turbine inlet pressure and the other of said forces being generated by a surface exposed to compressor outlet pressure.

2. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, and means for controllably modulating the bias exerted by said second force whereby to effect movement of said valve means.

3. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, and means for lowering said second force in response to a turbosupercharger condition without lowering said fourth force whereby to effect movement of the valve means in the opening direction.

4. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, and means for controllably venting the pressure acting on the surface generating said second force to effect movement of the valve means in the opening direction.

5. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, and means for controllably venting the pressure acting on the surface generating said second force to effect movement of the valve means in the opening direction, said means being controlled by the ratio between the outlet and inlet pressures of the compressor.

6. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, a second valve controlling a vent for the pressure acting on the surface generating said second force, and means responsive to a turbosupercharger condition for operating said second valve.

7. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means toward closed position, a second force adding to said bias for closing said valve means, said second force being generated by a surface exposed to compressor outlet pressure, third and fourth forces operating to urge said valve means in a direction to open said bypass passage, said third force being generated by a surface exposed to turbine inlet pressure and said fourth force being generated by a surface exposed to compressor outlet pressure, a second valve controlling a vent for the pressure acting on the surface generating said second force, and means responsive to a turbosupercharger condition for operating said second valve, said last mentioned means including differential means responsive to the ratio between the outlet and inlet pressures of the compressor.

8. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, spring means normally biasing said valve means toward closed position, a second means responsive to compressor outlet pressure also biasing said valve means toward closed position, a third means responsive to turbine inlet pressure biasing said valve means toward open position, a fourth means responsive to compressor outlet pressure biasing said valve means toward open position, and means for controllably lowering the biasing force exerted by said second means whereby to effect opening of the valve means.

9. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, spring means normally biasing said valve means toward closed position, a second means responsive to compressor outlet pressure also biasing said valve means toward closed position, a third means responsive to turbine inlet pressure biasing said valve means toward open position, a fourth means responsive to compressor outlet pressure biasing said valve means toward open position, a second valve means controlling a vent for the pressure acting on said second means, and means for actuating said second valve means.

10. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, spring means normally biasing said valve means toward closed position, a second means responsive to compressor outlet pressure also biasing said valve means toward closed position, a third means responsive to turbine inlet pressure biasing said valve means toward open position, a fourth means responsive to compressor outlet pressure biasing said valve means toward open position, a second valve controlling a vent for the pressure acting on said second means, and means responsive to a turbosupercharger condition for operating said second valve.

11. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, spring means normally biasing said valve means toward closed position, a second means responsive to compressor outlet pressure also biasing said valve means toward closed position, a third means responsive to turbine inlet pressure biasing said valve means toward open position, a fourth means responsive to compressor outlet pressure biasing said valve means toward open position, a second valve controlling a vent for the pressure acting on said second means, and means responsive to a turbosupercharger condition for operating said second valve, said last mentioned means including differential means responsive to the ratio between the outlet and inlet pressures of the compressor.

12. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means to closed position, diaphragm means connected to said valve means to apply biasing forces thereto for movement in opposite directions, means for conveying compressor outlet pressure directly to one side of said diaphragm means, means for conveying compressor outlet pressure to the side of the diaphragm means opposite said one side through a restricted orifice, a vent for said opposite side of said diaphragm means having a larger area than said restricted orifice, and means for controlling fluid flow through said vent.

13. A waste gate control for an engine turbosupercharger of the type having a turbine driven by gases exhausted from the engine to operate a compressor for supplying induction air to the engine, said control comprising: a passage for bypassing exhaust gases around the turbine, a poppet valve in said passage for controlling fluid flow therethrough, said valve having its face exposed to turbine inlet pressure to apply a force tending to move the valve in the opening direction, spring means biasing said valve toward closed position, diaphragm means connected to said valve to apply biasing forces thereto for movement in opposite directions, means for conveying compressor outlet pressure directly to one side of the diaphragm means, means for conveying compressor outlet pressure to the side of the diaphragm means opposite said one side through a restricted orifice, a vent for said opposite side of said diaphragm means having a larger area than said restricted orifice, and means for controlling fluid flow through said vent.

14. A waste gate control for an engine turbosupercharger of the type having a turbine driven by gases exhausted from the engine to operate a compressor for supplying induction air to the engine, said control comprising: a passage for bypassing exhaust gases around the turbine, a poppet valve in said passage for controlling fluid flow therethrough, said valve having its face exposed to turbine inlet pressure to apply a force tending to move the valve in the opening direction, spring means biasing said valve toward closed position, diaphragm means connected to said valve to apply biasing forces thereto for movement in opposite directions, means for conveying compressor outlet pressure directly to one side of said diaphragm means, means for conveying compressor outlet pressure to the side of the diaphragm means opposite said one side through a restricted orifice, a vent for said opposite side of said diaphragm means having a larger area than said restricted orifice, a second valve controlling fluid flow through said vent, and means responsive to the ratio between the outlet and inlet pressures of the compressor for operating said second valve.

15. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means to closed position, a first diaphragm connected to said valve means and defining a chamber, means for conveying compressor outlet pressure directly to said chamber for biasing said valve means toward open position, a second diaphragm connected to said valve means and defining a second chamber, means for conveying compressor outlet pressure to said second chamber through a restricted orifice for biasing said valve means toward closed position, a vent for said second chamber having a larger area than said restricted orifice, a second valve means for controlling the passage of fluid through said vent, and means for actuating said second valve means.

16. A waste gate control for an engine turbosupercharger of the type having a turbine driven gas gases exhausted from the engine to operate a compressor for supplying induction air to the engine, said control comprising: a passage for bypassing exhaust gases around the turbine, valve means in said passage for controlling fluid flow therethrough, means normally biasing said valve means to closed position, a first diaphragm connected to said valve means and defining a chamber, means for conveying compressor outlet pressure directly to said chamber for biasing said valve means toward open position, a second diaphragm connected to said valve means and defining a second chamber, means for conveying compressor outlet pressure to said second chamber through a restricted orifice for biasing said valve means toward closed position, a vent for said second chamber having a larger area than said restricted orifice, a second valve controlling fluid flow through said vent, and means operating said second valve in response to the ratio between the outlet and inlet pressures of the compressor.

17. A waste gate control for an engine turbosupercharger of the type having a turbine driven by gases exhausted from the engine to operate a compressor for supplying induction air to the engine, said control comprising: a passage for bypassing exhaust gases around the turbine, valve means in said passage for controlling fluid flow therethrough, means normally biasing said valve means to closed position, a first diaphragm connected to said valve means and defining a chamber, means for conveying compressor outlet pressure directly to said chamber for biasing said valve means toward open position, a second diaphragm connected to said valve means and defining a second chamber, means for conveying compressor outlet pressure to said second chamber, means for conveying compressor outlet pressure to said second chamber through a restricted orifice for biasing said valve means toward closed position, the area of said second diaphragm being greater than the area of said first diaphragm to apply a force normally overriding the force exerted by said first diaphragm, a vent for said second chamber having a larger area than said restricted orifice, and means for controlling fluid flow through said vent.

18. A waste gate control for an engine turbosupercharger of the type having a turbine driven by gases exhausted from the engine to operate a compressor for supplying induction air to the engine, said control comprising: a passage for bypassing exhaust gases about said turbine, a poppet valve in said passage for controlling fluid flow therethrough, said valve having its face exposed to turbine inlet pressure to exert a force tending to move the valve toward open position, spring means biasing said valve toward closed position, a first diaphragm connected to said valve and defining a chamber, means for conveying compressor outlet pressure directly to said chamber for biasing said valve toward open position, a second diaphragm connected to said valve and defining a second chamber, means for conveying compressor outlet pressure to said second chamber through a restricted orifice for biasing said valve toward closed position, a vent for said second chamber having a larger area than said restricted orifice, and means for controlling fluid flow through said vent.

19. Valve means comprising: a valve element; means biasing said valve element toward closed position; a first diaphragm connected to said valve element, said first diaphragm having one of its surfaces exposed over its entire area to fluid pressure for moving said valve element in the opening direction in opposition to said biasing means; a second diaphragm connected to said valve element, said second diaphragm having one side exposed to the fluid pressure acting on the said one surface of said first diaphragm for biasing said valve element toward closed position, the other side of said second diaphragm being exposed at all times to a region of lower pressure; means for feeding said fluid pressure directly to said first diaphragm; means for feeding said fluid pressure to said one side of said second diaphragm through a restricted orifice; a vent for the fluid pressure acting on said second diaphragm, said vent having a larger area than the restricted orifice; and means for controllably opening and closing said vent.

20. Valve means comprising: a poppet valve having its face exposed to a first fluid pressure so as to be biased thereby toward open position; means biasing said poppet valve toward closed position; a first diaphragm connected to said poppet valve, said first diaphragm having a surface exposed to a second fluid pressure for moving said poppet valve toward open position; a second diaphragm connected to said poppet valve, said second diaphragm having one side exposed to said second fluid pressure for biasing said poppet valve toward closed position, the other side of said second diaphragm being exposed at all times to a region of lower pressure, the area of said second diaphragm being greater than the area of said first diaphragm to apply a force normally overriding the force exerted by said first diaphragm; means for feeding said second fluid pressure directly to said first diaphragm; means for feeding said second fluid pressure to said one side of said second diaphragm through a restricted orifice; a vent for the fluid pressure acting on said second diaphragm, said vent having a larger area than the restricted orifice; and means for controllably opening and closing said vent.

21. Valve means comprising: a poppet valve having its face exposed to a first fluid pressure so as to be biased thereby toward open position; spring means biasing said poppet valve toward closed position; a first diaphragm connected to said poppet valve, said first diaphragm having one of its surfaces exposed over its entire area to a second fluid pressure, the combined forces exerted by said first fluid pressure on the face of said poppet valve and said second fluid pressure on said one surface of said first diaphragm normally overriding the force of said biasing spring means to move said poppet valve toward open position; a second diaphragm connected to said poppet valve, said second diaphragm having one side exposed to said second fluid pressure for biasing said poppet valve toward closed position, the other side of said second diaphragm being exposed at all times to a region of lower pressure; means for feeding said second fluid pressure directly to said first diaphragm; means for feeding said second fluid pressure to said one side of said second diaphragm through a restricted orifice; a vent for the fluid pressure acting on said second diaphragm, said vent having a larger area than the restricted orifice; and means for controllably opening and closing said vent.

22. Valve means comprising: a valve element; means biasing said valve element toward closed position; a first diaphragm connected to said valve element, said first diaphragm having one of its surfaces exposed over its entire area to fluid pressure for moving said valve element in the opening direction in opposition to said biasing means; a second diaphragm connected to said valve element, said second diaphragm having one side exposed to the fluid pressure acting on the said one surface of said first diaphragm for biasing said valve element toward closed position, the other side of said second diaphragm being exposed at all times to a region of lower pressure, the area of said second diaphragm being greater than the area of said first diaphragm to apply a force normally overriding the force exerted by said first diaphragm; means for feeding said fluid pressure directly to said first diaphragm; means for feeding said fluid pressure to said one side of said second diaphragm through a restricted orifice; a vent for the fluid pressure acting on said second diaphragm, said vent having a larger area than the restricted orifice; and means for controllably opening and closing said vent.

(References on following page)

References Cited in the file of this patent

UNITED STATES PATENTS

| | | |
|---|---|---|
| 2,000,002 | Stockmeyer | Apr. 30, 1935 |
| 2,042,781 | Grove | June 2, 1936 |
| 2,559,623 | Holmes | July 10, 1951 |
| 2,565,482 | Dolza et al. | Aug. 28, 1951 |
| 2,619,777 | La Point | Dec. 2, 1952 |
| 2,683,580 | Griswold | July 13, 1954 |
| 2,811,168 | Davies et al. | Oct. 29, 1957 |
| 2,882,006 | Reinecke | Apr. 14, 1959 |